No. 646,220. Patented Mar. 27, 1900.
E. M. IVENS.
COTTON BALING PRESS.
(Application filed Oct. 16, 1899.)
(No Model.) 5 Sheets—Sheet 1.
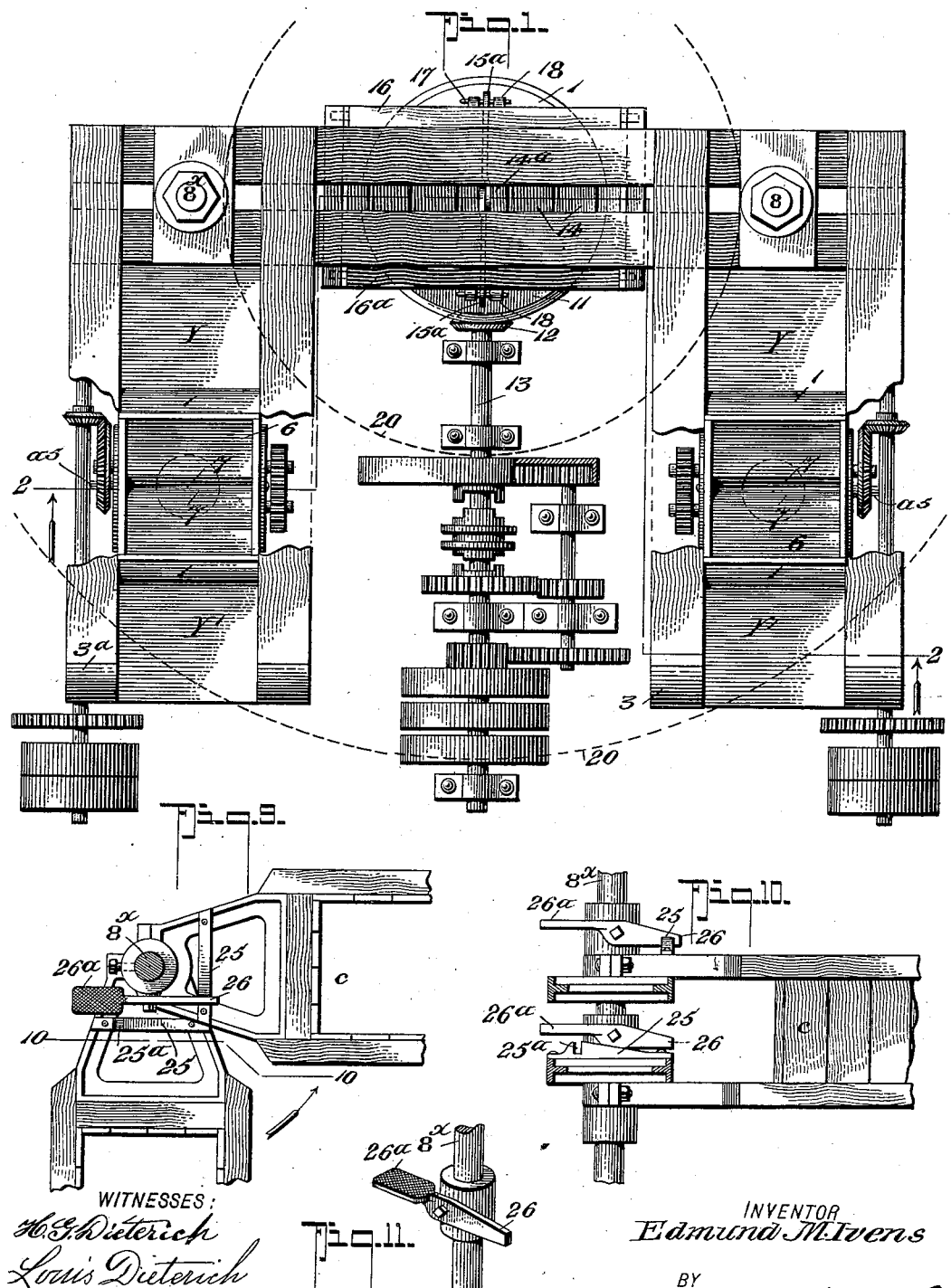
WITNESSES:
H. G. Dieterich
Louis Dieterich
INVENTOR
Edmund M. Ivens
BY
Fred G. Dieterich & Co.
ATTORNEYS

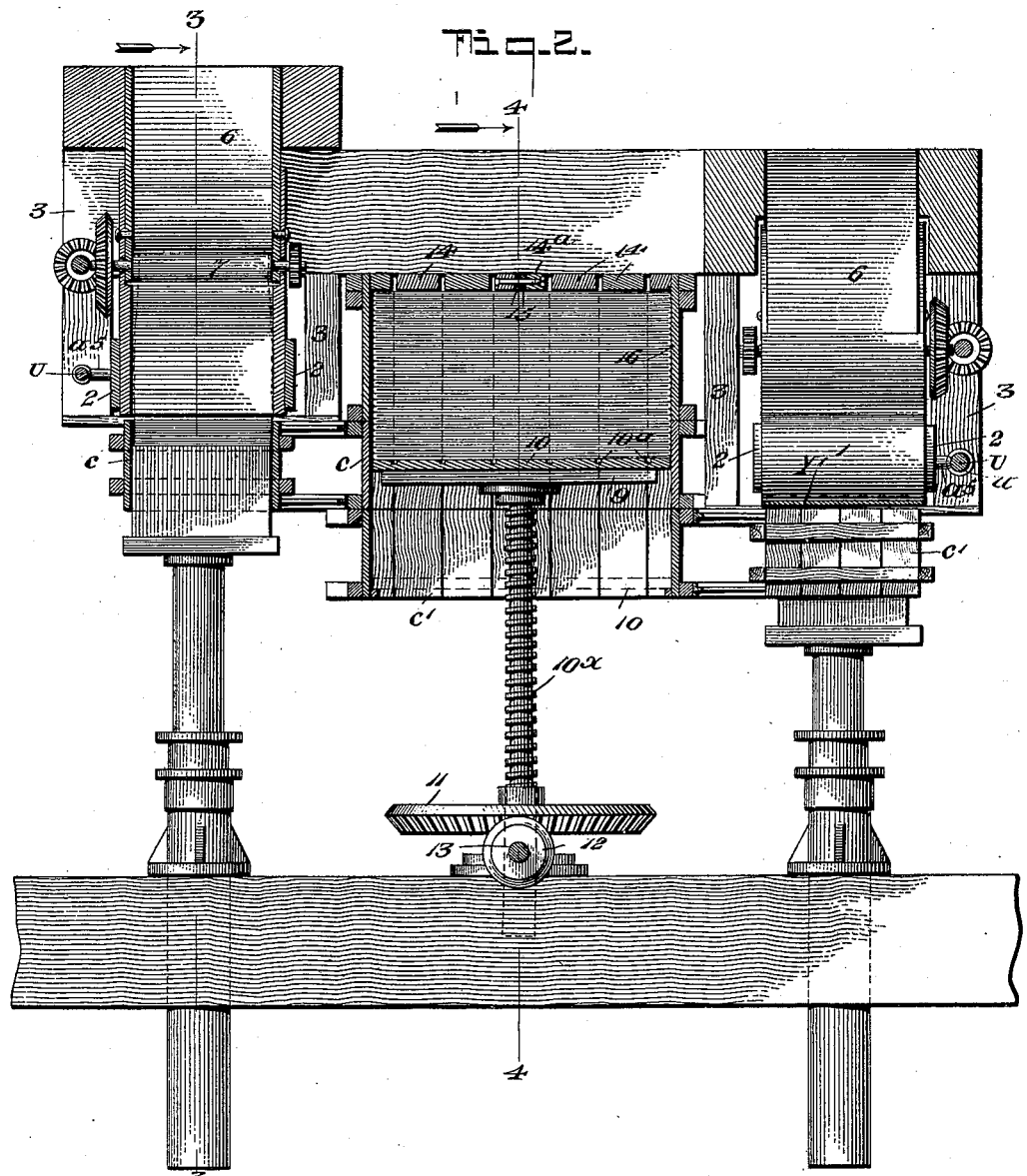

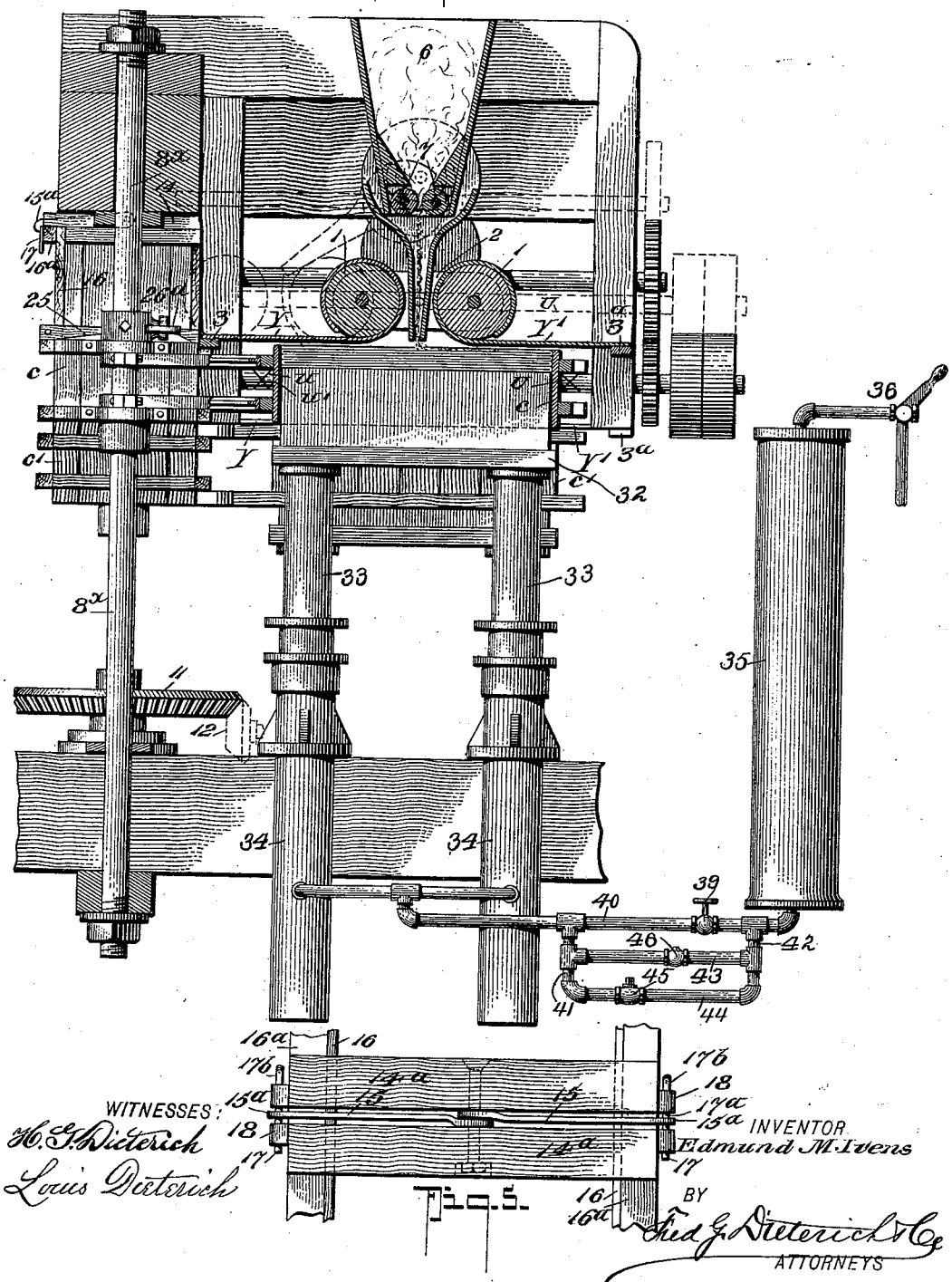

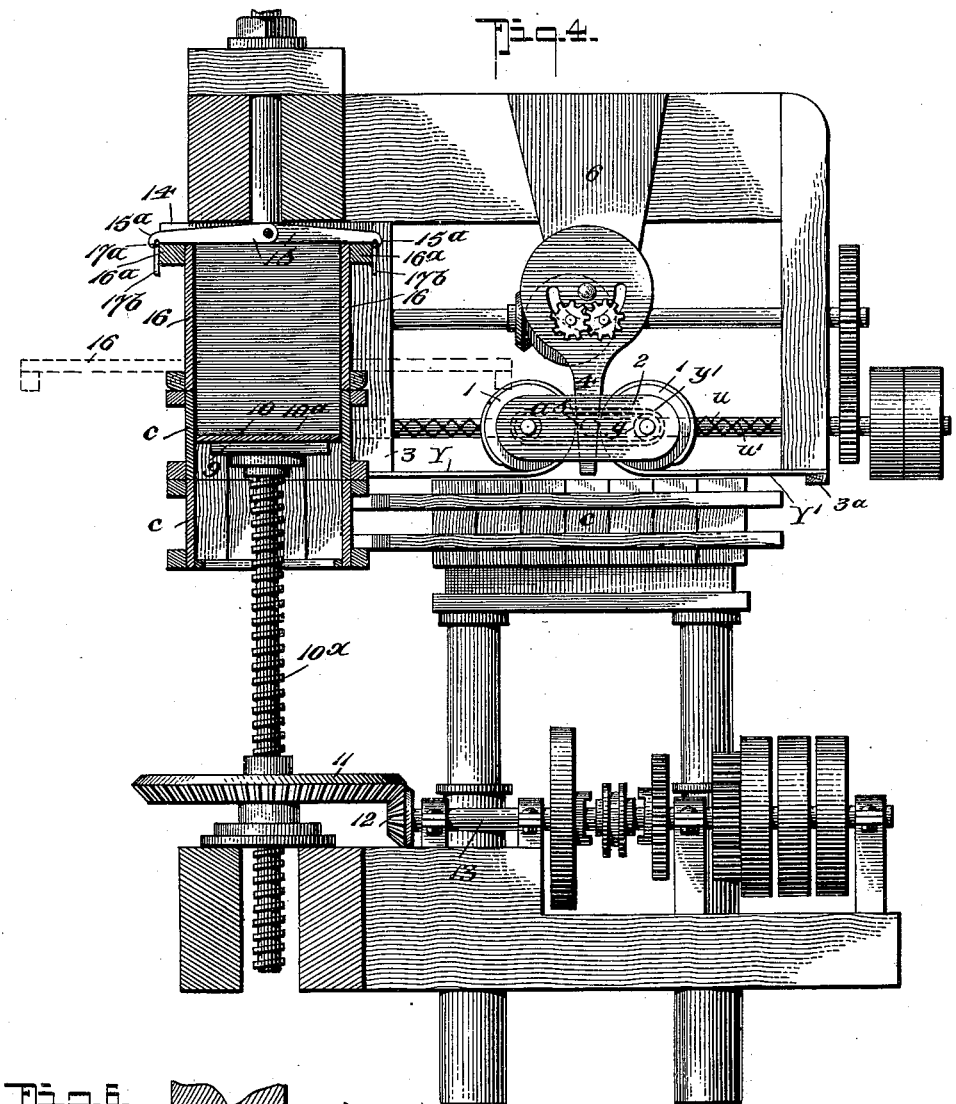

No. 646,220. Patented Mar. 27, 1900.
E. M. IVENS.
COTTON BALING PRESS.
(Application filed Oct. 16, 1899.)
(No Model.) 5 Sheets—Sheet 5.
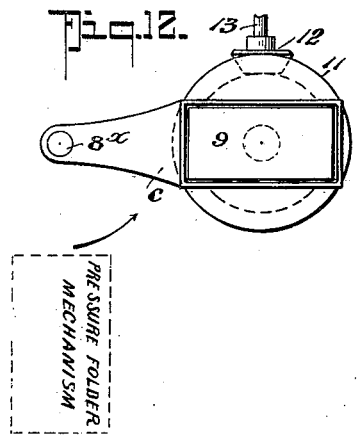
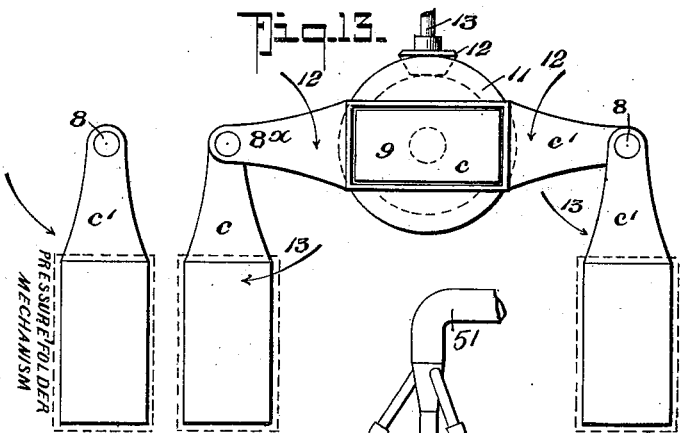
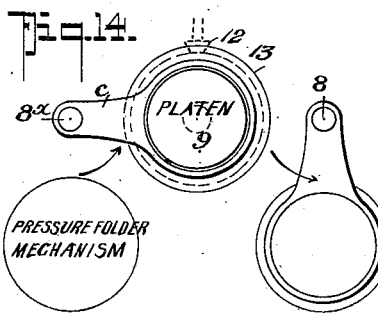
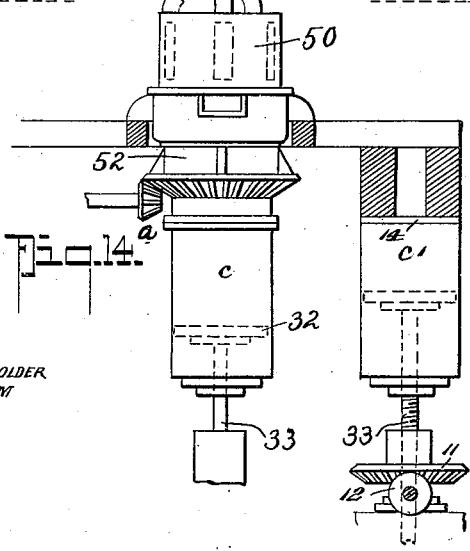
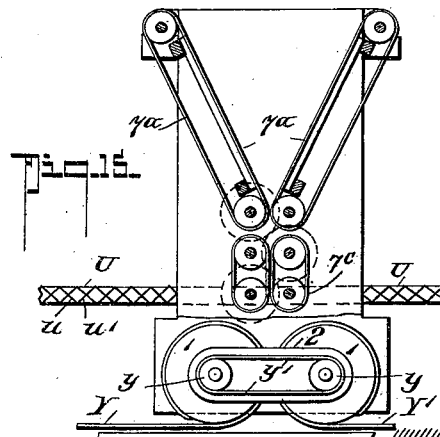
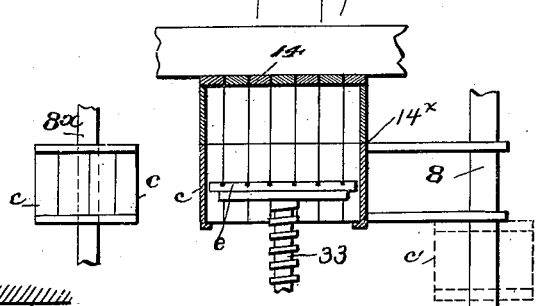
WITNESSES:
H. G. Dieterich
Louis Dieterich
INVENTOR
Edmund M. Ivens
BY
Fred J. Dieterich & Co.
ATTORNEYS

UNITED STATES PATENT OFFICE.

EDMUND M. IVENS, OF NEW ORLEANS, LOUISIANA.

COTTON-BALING PRESS.

SPECIFICATION forming part of Letters Patent No. 646,220, dated March 27, 1900.

Application filed October 16, 1899. Serial No. 733,759. (No model.)

*To all whom it may concern:*

Be it known that I, EDMUND M. IVENS, of New Orleans, in the parish of Orleans and State of Louisiana, have invented a new and Improved Cotton-Baling Press, of which the following is a specification.

This invention relates to improvements in compressing-machines adapted for baling cotton and other fibrous materials; and it specifically refers to that class of machines having an upper pressure-surface and a lower receding pressure-surface upon which (the lower or receding surface) the bale is formed by repeatedly lapping upon said surface the cotton in superposed layers, which is fed to the compressing-surface in the form of a sheet or bat.

Heretofore presses have been provided operating under this principle, some of which produce a bale of a square shape, while others make the bale of round shape, such forms of press being disclosed in my Patent No. 623,020, dated April 11, 1899, which is constructed to form a square bale, and Patent No. 630,369, to G. A. Lowry, dated August 8, 1899, which is constructed to form a round bale.

It is deemed proper to state that the receding or lower pressure-surface (which *per se* forms no part of my present invention, as the same is broadly claimed and disclosed in my Patent No. 623,020, aforesaid) consists, essentially, of a follower that only recedes as the pressure of cotton gathered in layers thereupon exceeds the pressure which it is intended to impart to the cotton, the receding action being gradual or with a step-by-step movement which is so governed that it will only relieve the cotton from excess pressure.

While my present invention generically is adapted for use either with means for feeding the bat in spiral layers to form a round bale or with means for feeding the bat in opposite straightway directions, the same in its subordinate nature covers improvements especially relating to that type of press disclosed in my Patent No. 623,020.

The principal objection found in the practical use of machines operating on the generic principle hereinbefore noted, either to form a round or a square bale, is that it requires too much time in the completion of the bale, this being particularly true of that form or principle in which the superposed layers are spirally lapped to form the round bale.

Another objection found in the practical use of the aforesaid type of machines is that the bale-forming mechanism is adjusted to produce a bale of a predetermined size, which objection is of a serious nature in that it often occurs that the planter who has a small amount of cotton frequently brings to the ginnery and press-house an amount insufficient to form a complete bale of the size for which the press is adjusted. To complete the bale under such conditions, it is necessary to add other cotton. This the planter objects to, as it does not provide a complete bale of his own staple and often condemns such kind of bale, as the buyer does not receive a bale of cotton in which the character of the cotton is alike throughout.

The objects of my invention are, first, to provide a baling-press in which bales of different sizes may be readily formed; second, to provide a press in which the bale can be formed more rapidly than has heretofore been accomplished; third, to provide an improved construction of press in which a plurality of pressure and folding means are provided for effecting an initial compression of the bale which operate in connection with the single final-pressure-operating mechanism; fourth, to provide a press operating quickly and in which the parts are so constructed that as one bale is receiving its final pressure the next bale is being formed in horizontal sections, each section being produced by its own bat forming and compressing means; fifth, to provide an improved press for forming the complete bale, first in a plurality of sections, each section being subjected to its own initial compressing mechanism, and in which the parts are so arranged that after each section has been initially formed the several sections can be brought in position to receive a final pressure effected by a single pressure-operating mechanism; sixth, to provide certain improvements in the pressure folding and lapping means whereby the bat can be the more uniformly made and laid.

With these objects in view, and other objects which will hereinafter be made clear, my invention in its subordinate features comprehends certain novel details of construction and peculiar combinations of parts, all of which will be hereinafter first described and then be specifically pointed out in the appended claims, reference being had to the accompanying drawings, in which—

Figure 1 is a top plan view illustrating a duplex press constructed in accordance with my invention, parts being broken away to the more clearly illustrate the pressure-folder-operating gearing. Fig. 2 is a vertical section taken practically on the line 2 2 of Fig. 1 looking in the direction indicated by the arrow. Fig. 3 is a vertical section taken on the line 3 3 of Fig. 2. Fig. 4 is a similar view taken on the line 4 4 of Fig. 2. Fig. 5 is a detail view of the latch devices for locking the doors of the final-compression chamber. Figs. 6, 7, and 8 are further detail views of such devices, hereinafter referred to. Fig. 9 is a top plan view, and Fig. 10 is a sectional view of the latch devices for holding the swinging boxes to their adjusted positions. Fig. 11 is a detail view of the gavity-latch forming part of the said devices. Fig. 12 is a diagram illustrating a single set of twin boxes. Fig. 13 is a similar view illustrating a duplex set of said boxes and the manner in which they are swung to their operative positions. Figs. 14 and 14$^a$ illustrate diagrammatically my improved form of duplex swinging boxes arranged to coact with lapping devices operating to form a round bale. Fig. 15 illustrates a modified form of hopper and bat-forming pressure-roll devices, hereinafter specifically referred to. Fig. 16 is a detail view of the feed-screw mechanism for imparting a reciprocal motion to the hopper and the lapper mechanism. Fig. 17 is a detail view illustrating diagrammatically the simplest manner of supporting my duplex press-boxes and which will hereinafter be specifically referred to.

In the practical construction of my invention I employ a screw-operated platen for imparting a final pressure to the bale and a pair of compression mechanisms, which coöperatively connect with the bat forming and lapping means that serves to place the cotton sheet or bat in superposed layers on the compression mechanism. In other words, with a single screw-operated platen I employ a plurality of lapping and compressing mechanisms, each of which serves to form in a complete shape a horizontal section of the bale, said sectional bale-forming mechanisms being so constructed that the several bale-sections can be readily brought into alinement over the screw-platen, and thereby be compressed into a complete bale of the required density and size, or, when it is desired to make a small-sized bale, each section can be brought into position independent of the others to be subjected to the final pressure by the screw-platen.

Various mechanisms may be provided capable of being worked on the plan above mentioned; but I prefer on the score of economy to render the operation so simple that the ordinary plantation-hands can operate the same, and to provide for a maximum speed in operation I construct the press on the plan illustrated in a general way in the accompanying drawings.

In the preferred form of my press, as illustrated in Figs. 1, 2, 3, and 4, pressure-rolls are provided, the function of which is to compress the sheet or bat as it is fed onto the receding follower and form, as it were, an upper pressure-surface that operates as against the lower pressure-surface or receding follower.

As the bat-forming lapping devices and the receding-follower mechanism for each bale-forming section are alike, a detailed description of one set of such mechanisms will suffice for all.

The upper pressure-surface in the preferred construction consists of a pair of rolls 1 1, that are journaled in end frame-timbers 2 2, held to reciprocate over the coincident press-box, the reciprocating movement of which may be effected in any well-known manner—for example, as disclosed in my Patent No. 623,020, in which a drive-shaft U is employed, having continuous right and left threadways $u$ $u'$, that bisect each other and which are joined at their ends by straight portions $u^2 u^3$, extended half-way around the shaft and in opposite directions, said threaded ways being arranged to be engaged by a driver pin or stud $a^5$, projected through one of the end timbers 2 2, as clearly illustrated in Fig. 16. The rolls 1 1 also serve to lay the bat as they press it down, and the said rolls are so disposed that when the frame that carries them is reciprocated they will travel directly over the press-box or bat-receiving compartment.

The rolls 1 1 are connected by a band $y'$, that passes over wheels $y$ on the projecting ends of the shafts of the rolls 1, said connecting-band serving to impart a uniform rotation to the rolls when the frame that carries them is reciprocated in the manner hereinafter further described.

Y Y' indicate flexible hands that have one end secured to the rolls 1, and the other or free ends of such bands are secured one, Y, to the frame-beam 3 and the other, Y', to the oppositely-disposed frame-piece 3$^a$.

The rolls 1 are suitably disposed to provide for a free passage of the cotton bat or sheet, which is guided or laid in superposed layers by the movement of the said rolls 1 1, the belts Y Y', and the lapper 4, which in the construction shown in Figs. 1 and 4 consists of a boot-like chute pivotally hung from the bottom of the hopper 6 to oscillate in the direction of movement of the rolls 1, as clearly illustrated in Fig. 3.

The hopper 6 in the construction shown in Figs. 1, 2, and 3 is fixedly held on the main frame and in practice under the condenser-rolls of the ginnery to receive the condensed material as it falls from therefrom. To draw the loose material down and at the same time compress it into a bat, the bottom of the hopper is dished toward the coacting surfaces of the bat forming or compression rolls 7 7, driven in any suitable manner.

Instead of making the hopper 6 a stationary one the same may be in the nature of a live hopper—that is, one whose sides are continuously movable to prevent the lodgment thereon of the cotton and embodying substantially the construction of the hopper described and claimed in my Patent No. 623,020, before referred to. In the present case, however, the hopper has its side walls made of endless flexible belts $7^a$, converging at the bottom and terminating at the pressure-rolls $7^c\ 7^c$, the said hopper also having a series of supplemental rolls $7^d$, geared together, as shown in Fig. 15, which supplemental rolls discharge the bat between the traveling rolls 1 1, as clearly shown in the said view, Fig. 15. In this latter form the hopper is mounted upon the frame that carries the rolls 1 1 and is reciprocated with it. The lapper 4 in this form of hopper is dispensed with and the bat led directly from the lowermost set of rolls $7^c$ between the rolls 1 1.

It will be noticed by reference to Fig. 4 that the two bat-forming layer and upper pressure-surface mechanisms are arranged in a parallel plane and separated a predetermined distance, the line of travel of the reciprocating presser-surface or folder of each of said mechanisms, bisecting a king-post. The two king-posts 8 $8^\times$ are disposed one to each side of the screw-operated plunger, the three—that is, the screw-operated plunger and the two posts 8—being in a plane at right angles to the direction in which the cotton-feeding, bat forming, and laying mechanisms project.

The screw-operated plunger, which *per se* involves no new features of construction and may be a duplication of the similar mechanism shown in my Patent No. 623,020, which comprehends generally a platen 9, mounted on the screw-shaft $10^\times$, that engages a screw-gear or master-wheel 11, rotated by a drive-pinion 12 on the drive-shaft 13, geared with reversely-operating and variable-speed gearing of any approved construction that will serve to drive the plunger up slowly under an accumulated power and rapidly downward, the screw-platen in the present case opposing a cross-head having the usual slatted bearing members 14, one of which in the present case is disposed over the axial line of the plunger-shaft, and to said center member $14^a$ is pivotally connected a pair of oppositely-extending drop latch-levers 15 15, which are provided to hold the doors of the bale-finishing compartment tightly closed during the operation of finishing and tying the bale.

By reference to Figs. 4 to 8 the construction and operation of the levers 15 will be readily understood. The two levers 15 project in opposite directions, and they have their ends terminating in hooks $15^a$, which, when the said levers drop, pass over the top cross-beams $16^a$ of the doors 16, that form the front and rear of the bale-finishing compartment, and engage with cams $17^a$, forming a part of the bars 17, held to rock in bearings 18, secured to the beams $16^a$, one of said bars being for each door, as shown, and the bars 17 having at their ends crank-handles $17^b$. When the doors are closed, the bars 17 are locked to bring their handles to a pendent position, as shown in full lines in Fig. 6, and when in this position the cam portions $17^a$ of the rock-bars 17 are turned down to permit the hook ends of the levers 15 dropping over the said bars to thereby hold the doors closed tight. After the bale is finished by turning the handle $17^b$, as indicated in dotted lines in Fig. 6, the cam portion $17^a$ will engage the hook ends of the bars 17 and throw them to an open position to permit the doors swinging outward and allow the finished bale to be shoved out.

Heretofore in baling of cotton by that form of press mechanism including dual press-boxes, one of which receives the bat from the bat forming and laying mechanism, while the other filled box is disposed over the final-pressure mechanism, the dual press-boxes have been almost universally of that construction which involves a central king-post, upon which is rotatably held a frame projected in opposite directions from the post and which at each end carries a press-box or cotton-receiving chamber, the two press-boxes being of like construction. When the press includes this form of dual boxes, it is obvious that bales of a predetermined size only can be made, and as the press must be adjusted or held during every swinging operation until the compartment under the bat-forming rolls and lapper mechanism receives the maximum amount of cotton necessary to complete the size of bale for which the press is originally adjusted, irrespective of the action of the finishing-plunger, whether the said action be fast or slow, it follows the results are not all that is desired, for the reason, first, that it is impossible to quickly adjust the finishing-platen and the receding-follower mechanism rapidly to form a bale smaller than the maximum size for which the press is adjusted; secondly, no matter whether the finishing-platen operated swiftly to complete the bale or slowly the operation of feeding the layers of cotton into the chamber and imparting the initial pressure thereto of necessity is slow and of a uniform character. With a view of remedying these objections and disadvantages, and especially that which lies in the loss of time necessary to impart the initial pressure to the bale, and also in that the press cannot be quickly adjusted to form bales of different sizes, in my present invention I provide a system of press-boxes arranged so that each will operate independently—that is, for producing a finished bale without coöperating with its mates—and in which the entire series of boxes are capable of being so arranged as to coöperate to produce a finished bale quicker than is possible with the ordinary form of press having dual press-boxes, my present construction also providing for a greatly-increased capacity of the press over such form of presses having dual press boxes or chambers that are arranged to always coöperatively act.

To clearly define the broad principle of my present invention so far as it relates to the press-box mechanism, it should be stated that the circular press-boxes now in common use are of such construction that but a single bat-forming and initial-presser mechanism can be used therewith, and as one of the dual compartments of the press is turned in one direction—say under the bat-laying and upper-pressure-folding devices—the other compartment is simultaneously moved over the screw-platen or finishing-pressure mechanism.

My present construction of press-box in its most generic sense includes a mechanism for imparting the finishing-pressure to the bale partly compressed by an initial-pressure mechanism and a plurality of press-boxes, which may be two, and with each of which coact an independent bat forming, laying, and upper-pressure-folding mechanism and receding-follower mechanism, and each of said press-boxes is so supported as to be swung over the single finishing-plunger mechanism which is common to all of the press-boxes and to coact with said finishing-plunger mechanism to produce a complete bale, or the two boxes may be both swung over the said finishing mechanism and the contents of the two boxes pressed into one bale by a single operation of the finishing-pressure mechanism. As hereinbefore stated, this form of press-box may be readily employed for use in connection with means for forming and laying the bat to make a round bale as well as a square bale, it being obvious that when a round bale is to be made the press-boxes are round in horizontal section instead of square, as shown.

By reference to Fig. 12, which illustrates diagrammatically the broad idea of my arrangement of press-boxes, 9 indicates the finishing presser-platen. 8 8$^\times$ indicate posts, one of which is on each side of the platen 9 and in the line therewith. $c$ indicates a press-box which may be of any suitable dimensions, but preferably of a depth less than that of the maximum-sized bale intended to be formed by the press, say one-half. One press-box $c$ is connected to each king-post 8 8$^\times$ at one end to swing in a horizontal plane in a circle around said post, the length of the press-boxes being such that when swung inward over the finishing-plunger they will be in a proper position to receive the said plunger from below, it being understood that the said presser finishing-plunger operates against the opposing cross-head. The bat forming and laying mechanism for each press-box $c$ extends at right angles from the line in which the king-posts and the finishing-platen stand, said mechanism being indicated in dotted lines. When but two boxes are used, one box rotates in a horizontal plane just under the plane in which the other box swings, and the bat forming and laying mechanism of the said lowermost press-box is correspondingly disposed on a lower plane than that of the similar mechanism for the opposite press-box. In this construction of boxes the said lower box is adapted for vertical movement on the king-post when it is swung from under its coincident bat forming and laying mechanism, so it can be brought up to proper position under the cross-head when turned over the finishing presser-platen.

By providing the two boxes and their coacting upper pressure folding and receding-follower mechanism, as described, it is manifest that the two boxes can be operated alternately to form small-sized or half bales, one box receiving the final pressure while the other is filling and receiving its initial pressure, it being, however, understood that this action is not necessarily a simultaneous one.

When it is desired to form a full-sized bale, the two boxes can be swung over the finishing-platen, one box directly under the other, and the contents of both boxes compressed by the finishing-platen into one bale.

When the form of box just described is to be used for making bales of a small size, the cross-head is disposed correspondingly near the plane in which the upper box swings and to produce a bale of the desired thickness; but when two boxes are used to form but a half-bale, which half-bales are afterward compressed into a single bale, the cross-head is spaced over the plane in which the upper box swings correspondingly.

When using the aforesaid form of boxes for making small-sized bales, the finishing-platen carries a follower-block $e$, having the usual tie-grooves, as indicated in Fig. 17.

By arranging the boxes $c$ $c'$ as shown in Fig. 17 and supporting the lowermost box $c'$ for vertical movement upon its king-post it follows that when it is desired to make very small bales—say of one-half the width of the ordinary bale—the boxes $c$ $c'$ can be alternately swung under the baling-chamber 14, it being understood that as the lowermost box $c'$ is normally held to swing in a plane below that of the box by making the said box $c'$ vertically movable upon the king-post it can be elevated by any suitable means upon its said king-post to bring its upper edge in a plane with the lower edge 14$^\times$ of the baling-chamber. When the boxes are thus arranged, the follower-block $e$ in the lower box $c'$ is held from dropping out of the bottom of the said box $c'$ in any well-known manner.

By supporting the two boxes $c$ $c'$ so that they can swing in different horizontal planes the said two boxes can be swung over the finishing-platen in unison and the two half-bale sections held therein compressed into one complete bale when so desired.

While the above-described arrangement of parts discloses the generic idea of my invention and presents an advantageous construction of press, yet to provide for the maximum capacity of a press constructed in accordance with my invention and also for obtaining a greater density of bale than is possible where the bale is subjected to initial pressure in the complete bulk, I provide the form of press-box illustrated in Figs. 1 to 5 of the accompanying drawings and diagrammatically shown in Fig. 12 of the said drawings. This form of boxes also shortens the pressure travel of the screw-platen, making it possible for one finishing screw-platen to effectively answer for two folding initial-pressure outfits.

In the preferred form of my press and as illustrated in Figs. 1 and 5 each king-post 8 $8^\times$ has mounted thereon a pair of press-boxes $c$ $c'$, held to swing in a circle, but in the same horizontal plane, the boxes $c'$ $c'$ on one king-post—for example, the one indicated by 8—being held to swing in a plane just below the boxes $c$ $c$, mounted upon the post $8^\times$. In this latter construction of press-boxes two of the boxes (one of each set) are being filled with cotton and subjected to the initial pressure, while the other two (one of each set) are in position for the final pressure imparted by the finishing screw-platen. By this system, two half-sections of bales are being initially made and composed independently of each other, while the other two half-sections are being simultaneously operated upon and compressed into a final density.

In the form of boxes last described, the two that swing in the lower plane each carries a false bottom or follower 10, having the usual tie-grooves $10^a$, the two boxes which swing in the upper plane being free of such follower, the cotton therein being held by friction or expansive force as the box is swung from the bat-laying and receding follower over the finishing-platen.

By reference to Fig. 13 it will be observed that as one box from each king-post is swung over in the direction of the arrow 12 the other two boxes are swung in the direction indicated by the arrow 13 to come under their respective bat-forming and initial-pressure mechanism. To hold the boxes to their operative position, suitable latch devices are provided—such, for example, as shown in Figs. 9, 10, and 11, which illustrate the hubs of the press-box extensions as having beveled ways 25 25, formed with suitable notches $25^a$, with which the gravity-latches 26, pivotally hung on the posts 8 $8^\times$, are adapted to engage, said latches having foot members $26^a$, by the compression of which the notch-engaging ends of the latches are elevated.

In the practical construction of my press the boxes are intended to be swung around on and supported as they are swung by a platform 20. (Indicated in dotted lines in Fig. 1.)

By providing a baling mechanism involving generically the construction such as I have described and shown, I am enabled to produce a bale of uniform density from start to finish and at no time, in the making thereof, is there any greater compression of any part of the bale while being made, and consequently no greater tension on the threads of the cotton at any one time over any other time, this being a very advantageous result, as in the formation of the round bale. Said bales usually, owing to the manner in which they are produced, have a soft center and grow gradually more dense as the bale is made, forming what may be termed a "rim-bound bale." It will also be readily understood that in my form of folder and pressure rolls the said rolls at all times are covered by a canvas or other non-sticking material, thereby avoiding danger of the cotton accumulating thereon and becoming crushed.

The receding-follower mechanism, hereinafter referred to, comprises a head 32, which may be connected to one or more plungers 33, (two being shown,) each vertically movable in the hydraulic cylinder 34. The cylinders 34 are supported in any approved manner for the conditions required, and the said cylinders communicate with the reservoir or receiver 35 of proper dimensions, all being arranged in the manner similar to a hydrostatic press. The reservoir 35 is designed to hold a body of water or other fluid under pressure, and into the upper end of the reservoir 35 extends the fluid-conveying valve-pipe 36. Communication between the reservoir and the cylinders 34 is established through a pipe connection 40, having a valve 39, and from opposite sides of the valve 39 depend pipes 41 42, connected at their lower and upper portions by a pair of pipes 43 44, one of which, 43, has a pressure-regulating valve and the other a check-valve 46, and it should be stated that the said pressure-regulating valve may be of any ordinary valve construction which will automatically open at a predetermined pressure. As the said receding-follower mechanism, as hereinbefore stated, *per se*, forms no part of my present invention, further description of details thereof is not deemed necessary.

In Figs. 14 and $14^a$ is illustrated diagrammatically the manner in which my invention is adapted for use with mechanism for lapping the bales spirally to form a round bale. In this form a plurality of pressure folding and lapping means is provided which may also be of any approved construction and embody generally the lint-cotton receiver 50, that receives the cotton from a condenser (not shown) through a pipe 51 and a rotating chamber 52, having a suitable cap-plate, (not shown,) which may be of any approved construction and from which the cotton is folded spirally into boxes $c$ or $c'$ onto the follower 32, mounted on the plunger 33. In this form of my invention as soon as the box $c$ $c'$ is filled the lapping and pressure mechanism is stopped, the bat at the upper edge of the box *c* or *c'* cut by any suitable means, and said filled box *c* or *c'* swung over, as indicated by the arrow in Fig. 14, above the final-pressure mechanism.

Having thus described my invention, what I claim, and desire to secure by Letters Patent, is—

1. As an improvement in machines for baling cotton and other fibrous material; the combination with the mechanism for exerting a final pressure on the cotton; of a plurality of independently-movable boxes or receiving-compartments mounted so as to be independently or in unison swung into position to coact with the final-pressure mechanism, and devices for each box for feeding and initially pressing the cotton into the same, for the purposes described.

2. An improved cotton-baling press; comprising a single pressure mechanism for imparting a final pressure on the cotton; of a plurality of independently-operating devices for compacting the cotton into a sheet and folding it under pressure; a press box or receiver for each of the aforesaid bat forming and folding devices, said boxes being relatively so arranged as to be independently or in unison swung over the final-pressure mechanism to coact therewith, for the purposes specified.

3. The combination with a plurality of compressing mechanism for compacting cotton into a bat or sheet, and folding the same in superposed layers; of a single mechanism common to all of the bat forming and folding mechanisms for exerting a final pressure on the cotton; a receiver for each of said bat forming and presser devices, said receivers being each independently supported so as to be independently or in unison swung over the final-pressure mechanism to coact therewith, for the purposes specified.

4. A baling-press, comprising a mechanism for effecting a final pressure on the cotton; a plurality of devices for compacting the cotton into a bat and folding same, one set of such devices being at each side of the final-pressure mechanism; of a swinging press-box for each of the bat forming and folding devices and mechanism permitting such press-boxes to be swung over the final-pressure mechanism to coact therewith, the several press-boxes having movement, in a horizontal plane.

5. In a baling-press; the combination with a single mechanism for applying the final pressure; a plurality of pressure-folders and a yielding follower for each pressure-folder; of a press-box for each pressure-folder and yielding follower, the several press-boxes being supported relatively to the final-pressure mechanism, and mounted so that they can be independently or in unison swung over the said final-pressure mechanism, for the purposes described.

6. A baling-press of the character described; comprising a plurality of pressure-folders; a receding pressure-follower for each folder; a single mechanism for imparting a final pressure to the partially-compressed bales; a press-box for each pressure folder and follower mechanism, said boxes being mounted to swing in alternate directions independently or in unison over the final-pressure mechanism, as set forth.

7. In an organized machine for baling cotton; the combination of the following elements, to wit: means for forming the bale in independent sections and imparting an initial pressure to each section, said means including swinging press-boxes or receivers in which the bale-sections are formed, said boxes having independent movement; a mechanism for imparting a final pressure to the complete bale, said press-boxes being mounted to swing to bring the bale-sections in position to be simultaneously pressed into a single and completed bale by the final-pressure mechanism.

8. An improved cotton-baling apparatus, comprising in combination a pair of pressure-folder mechanisms, and a receding follower for each pressure-folder; a press-box for each pressure-folder and receding follower, said boxes being independently supported; and a mechanism for imparting a final pressure to the cotton in the press-boxes common to both boxes and disposed between the two pressure-folder and receding-follower devices, said press-boxes being arranged to be swung into position to be operated on by the final-pressure mechanism.

9. An improved cotton-press, comprising in combination; means for first forming a bale in independent sections; devices for separately imparting an initial pressure to the said independent sections, said devices including a swinging box for each bale-section, said boxes being adapted to swing in different horizontal planes; and a final-pressure mechanism common to all of the sectional bale-forming devices, said final-pressure mechanism being so disposed that the different boxes can be swung into a registering position thereover, whereby the contents of all of the boxes can be subjected to a simultaneous final pressure and form the sections into a single bale.

10. An improved cotton-press, comprising a pair of pressure folding mechanisms, and a receding follower for each of said mechanisms; a mechanism for exerting a final pressure on the bale; a set of press-boxes for each folder and receding follower, one set of boxes being in a different horizontal plane from the other, each set consisting of two boxes supported for independent swinging movement, but movable in the same horizontal plane, whereby as one box of each set is under the folder the other box can be swung over the final-pressure mechanism, substantially as shown and described.

11. An improved cotton-press, comprising a pair of pressure folding mechanisms and a receding follower for each of said mechanisms; a mechanism for exerting a final pressure on the bale; a set of press-boxes for each folder and receding follower, one set of boxes being in a different horizontal plane from the other, each set consisting of two boxes supported for independent swinging movement, the set moving in the lowermost plane having a follower-bottom provided with the usual tie-grooves, the boxes of each set being supported to move in the same horizontal plane, whereby as one box of each set is under the folder the other box can be swung over the final-pressure mechanism, substantially as shown and described.

12. As an improvement in cotton-presses adapted for baling bat or sheet cotton; a plurality of mechanisms for folding and imparting an initial pressure to the cotton, each mechanism being arranged to form an independent section of the bale; a single mechanism for imparting a final pressure to the bale, and means for swinging the two partially-compressed bale-sections to a position to be simultaneously compressed into a single bale by the final-pressure mechanism.

13. As an improvement in cotton-baling presses of the class described; the combination with the centrally-disposed mechanism for effecting a final pressure on partially-pressed bales; of a pair of bat-forming, folder and initial-pressing mechanisms, projected one at each side of the final-pressure mechanism; a king-post in line with each initial-pressure and folder mechanism; a pair of press-box sections pivotally connected with each king-post, one pair to swing in a plane below the other pair and the two boxes of each pair swinging in the same plane, said boxes being held for independent movement whereby as one box of each set is under its respective folder and initial-pressure mechanism the other can be swung over the final-pressure mechanism, and vice versa, for the purposes described.

14. As an improvement in cotton-baling presses of the kind described; the combination with the centrally-disposed mechanism for completing a final pressure to partially-pressed bales; of a pair of bat-forming folder and initial-pressing mechanisms, projected one from each side of the final-pressure mechanism; a king-post in line with each initial-pressure folder mechanism; a pair of press-box sections pivotally connected with each king-post; latch devices connected with the king-post and the press-boxes for locking the said boxes to their operative positions; one pair of said press-boxes being arranged to swing in a plane below the other pair, and the two boxes of each pair supported to swing in the same horizontal plane, said boxes being held for independent movement whereby as one box of each set is under its respective folder and initial-pressure mechanism the other can be swung over the final-pressure mechanism, and vice versa, for the purposes described.

EDMUND M. IVENS.

Witnesses:
W. E. BIRCHMORE,
J. E. BRADING.